F. C. Goffin,
Fire-Proof Safe.
No. 263. Reissued Apr. 25, 1854.
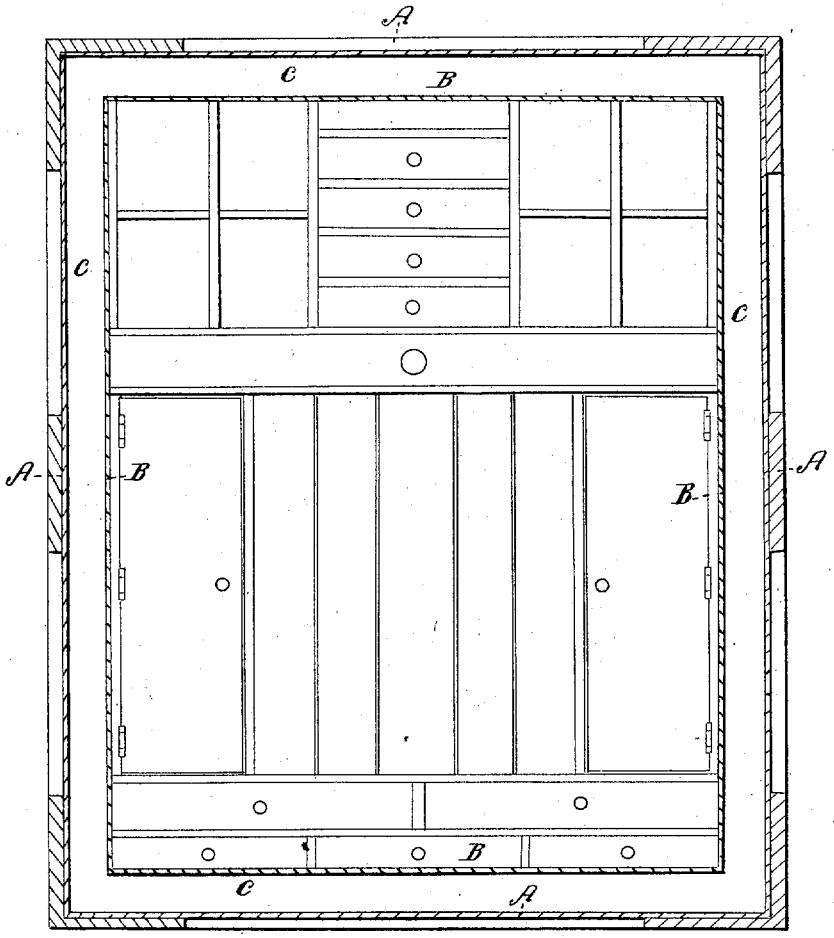
AM. PHOTO-LITHO. CO. N.Y. (OSBORNE'S PROCESS.)

UNITED STATES PATENT OFFICE.

F. C. GOFFIN, OF NEW YORK, N. Y., ASSIGNOR TO A. B. ELY.

IMPROVEMENT IN FIRE AND BURGLAR PROOF SAFES.

Specification forming part of Letters Patent No. 10,517, dated February 14, 1854; Reissue No. 263, dated April 25, 1854.

*To all whom it may concern:*

Be it known that I, F. C. GOFFIN, of the city, county, and State of New York, have invented a new and useful Improvement in Iron Safes, Bank-Vault Doors, &c., whereby they are rendered fire-proof and burglar-proof, and which I term "Crystal Safes and Doors;" and I do hereby declare that the following is a full, clear, and exact description of the same, reference being had to the accompanying drawing, making a part of this specification, which drawing is a vertical section of a safe constructed according to my approved plan.

The nature of my invention consists in filling the space between the two casings of a safe or door, either wholly or in part, with glass or slag in a vitrified state, for the purpose of rendering the safe or door fire-proof, and also proof against burglars, glass being a poor conductor of heat, and so hard as to prevent the operation of boring or drilling through the sides of the safe or door.

In the accompanying drawing, A represents the external casing, which is of metal, and B the internal casing, also of metal, the requisite space being left between the two in the same manner as in the ordinary fire-proof safes now in use.

C is the glass with which the space between the casings A B is filled. The glass may be poured molten into the space; or thick plates of glass may be formed and placed within, through which it is practically impossible to drill or bore.

The plates may be confined to the casings by any proper methods, and they are so obvious that they need not be specified.

I do not claim forming safes or doors with double casings; but,

Having described my invention, what I claim is—

The use of glass or slag in a vitrified state in the filling of safes or vault-doors, either poured molten into the spaces or inserted in plates, substantially as described.

F. C. GOFFIN.

Witnesses:
L. PITKIN,
W. N. ELY.